United States Patent
Xiao

(10) Patent No.: US 12,341,436 B2
(45) Date of Patent: Jun. 24, 2025

(54) DRIVING CIRCUIT FOR DRIVING A RECTIFIER DEVICE IN A HIGH FREQUENCY RESONANT CONVERTER

(71) Applicant: Chengdu Monolithic Power Systems Co., Ltd., Chengdu (CN)

(72) Inventor: Bin Xiao, Chengdu (CN)

(73) Assignee: Chengdu Monolithic Power Systems Co., Ltd., Sichuan (CN)

( * ) Notice: Subject to any disclaimer, the term of this patent is extended or adjusted under 35 U.S.C. 154(b) by 258 days.

(21) Appl. No.: 18/318,205

(22) Filed: May 16, 2023

(65) Prior Publication Data
US 2023/0412088 A1    Dec. 21, 2023

(30) Foreign Application Priority Data
May 17, 2022 (CN) .......................... 202210535913.8

(51) Int. Cl.
*H02M 3/335*    (2006.01)
*H02M 1/00*    (2007.01)

(52) U.S. Cl.
CPC ..... *H02M 3/33592* (2013.01); *H02M 1/0012* (2021.05); *H02M 1/0058* (2021.05); *H02M 3/33515* (2013.01)

(58) Field of Classification Search
CPC .......... H02M 1/0012; H02M 3/33515; H02M 3/33592
See application file for complete search history.

(56) References Cited

U.S. PATENT DOCUMENTS

| | | | | |
|---|---|---|---|---|
| 8,416,587 | B2 * | 4/2013 | Chen ................. | H02M 3/33592 363/21.06 |
| 10,951,124 | B2 * | 3/2021 | Li ...................... | H02M 3/33592 |
| 2018/0226897 | A1 * | 8/2018 | Kong ................. | H02M 3/33592 |
| 2018/0269797 | A1 * | 9/2018 | Vemuri ............. | H02M 3/33592 |
| 2019/0165686 | A1 * | 5/2019 | Wang ................. | H02M 3/33592 |
| 2019/0393794 | A1 * | 12/2019 | Feng ..................... | H03K 17/18 |

\* cited by examiner

*Primary Examiner* — Gary A Nash
(74) *Attorney, Agent, or Firm* — Perkins Coie LLP

(57) ABSTRACT

A driving circuit of a rectifier device. The gate-source voltage of the rectifier device is continuously detected to provide a monitoring signal. When the monitoring signal reaches a first threshold voltage, a regulation circuit in the driving circuit is configured to regulate an output driving voltage of the driving circuit to decrease linearly.

19 Claims, 8 Drawing Sheets

DRIVING CIRCUIT FOR DRIVING A RECTIFIER DEVICE IN A HIGH FREQUENCY RESONANT CONVERTER

CROSS REFERENCE

This application claims the benefit of CN application No. 202210535913.8 filed on May 17, 2022 and incorporated herein by reference.

TECHNICAL FIELD

The present invention relates to the field of electronic circuits, and particularly to driving circuits for rectifier devices in resonant converters.

BACKGROUND OF THE INVENTION

In existing resonant converters, Metal Oxide Semiconductor Field Effect Transistor (MOSFET) devices are usually used as rectifier devices. A drain-source voltage (i.e., a voltage drop between a drain terminal and a source terminal) of a MOSFET functioning as a rectifier device of a resonant converter is sampled to control the MOSFET ON and OFF, so as to ensure efficient operation of the resonant converter.

Under normal circumstances, when the rectifier device is ON, if the drain-source voltage of the rectifier device arises to a preset threshold voltage, a gate-source voltage (i.e., a voltage drop between a gate terminal and a source terminal) of the rectifier device will be reduced, so as to increase the on-resistance of the rectifier device. For this situation, even if the current flowing through the rectifier device is relatively small, the drain-source voltage of the rectifier device can remain unchanged, and when the current flowing through the rectifier device is further reduced resulting in the drain-source voltage reversely reaches a turn-off threshold voltage, the rectifier device is turned off. With the increase of the operating frequency of the resonant converter, one problem is how to quickly reduce the gate-source voltage of the rectifier device when the drain-source voltage of the rectifier device arises to the preset threshold voltage, without causing the drain-source voltage of the rectifier device to have excessive disturbance and resulting in false turn-off. To solve this problem, some converters use an error amplifier to reduce the gate-source voltage of the rectifier device. However, since the response of the error amplifier is relatively slow, this approach can not realize a rapid reduction in the rectifier device gate-source voltage.

Therefore, a driving circuit of the rectifier device which can quickly reduce the gate-source voltage of the rectifier device with a small disturbance of the drain-source voltage is required.

SUMMARY OF THE INVENTION

Embodiments of the present invention are directed to a driving circuit of a rectifier device. The driving circuit uses a regulation circuit to receive a first threshold voltage and a monitoring signal. The driving circuit is configured to regulate an output driving voltage of the driving circuit based on the first threshold voltage and the monitoring signal. When the monitoring signal indicative of a drain-source voltage of the rectifier device reaches to the first threshold voltage, the output driving voltage, which is adapt to be configured to drive a gate terminal of the synchronous rectifier device, may be regulated to decrease in the form of a first plurality of linearly dropping ramp segments to a first voltage level within a first pull-down period.

In one embodiment of the present invention, the regulation circuit is configured to regulate the output driving voltage to decreases to in the form of a second plurality of linearly dropping ramp segments to a second voltage level within a second pull-down period.

In one embodiment of the present invention, the regulation circuit is configured to regulate the output driving voltage to decreases to in the form of a third plurality of linearly dropping ramp segments to a third voltage level within a third pull-down period.

Embodiments of the present invention may provide a driving circuit of the rectifier device which can quickly reduce the gate-source voltage of the rectifier device with a small disturbance of the drain-source voltage.

BRIEF DESCRIPTION OF DRAWINGS

For a better understanding of the invention, embodiments of the invention will be described in accordance with the following drawings, which are used for illustrative purpose only. The drawings illustrate only some of the features in an embodiment. It should be understood that the drawings are not necessarily to scale.

Like elements are provided with like reference numerals in different appended drawings.

DETAILED DESCRIPTION OF THE INVENTION

Detailed description of the embodiments is provided merely to give examples and not intended to be limiting. Plenty of details are provided to assist the reader in gaining a comprehensive understanding of the present invention. However, many other ways of implementing the disclosure of this application described herein will be apparent. Description of circuits, materials and methods that are known in the art may not be addressed in this disclosure for simplicity.

Throughout the specification, the term "coupled" as used herein, is defined as directly or indirectly connected in an electrical or non-electrical manner. The articles "a," "an," and "the" are intended to include the plural forms as well, unless the context clearly indicates otherwise. The phrase "in one embodiment" as used herein does not necessarily refer to the same embodiment, although it may.

Figure 1:
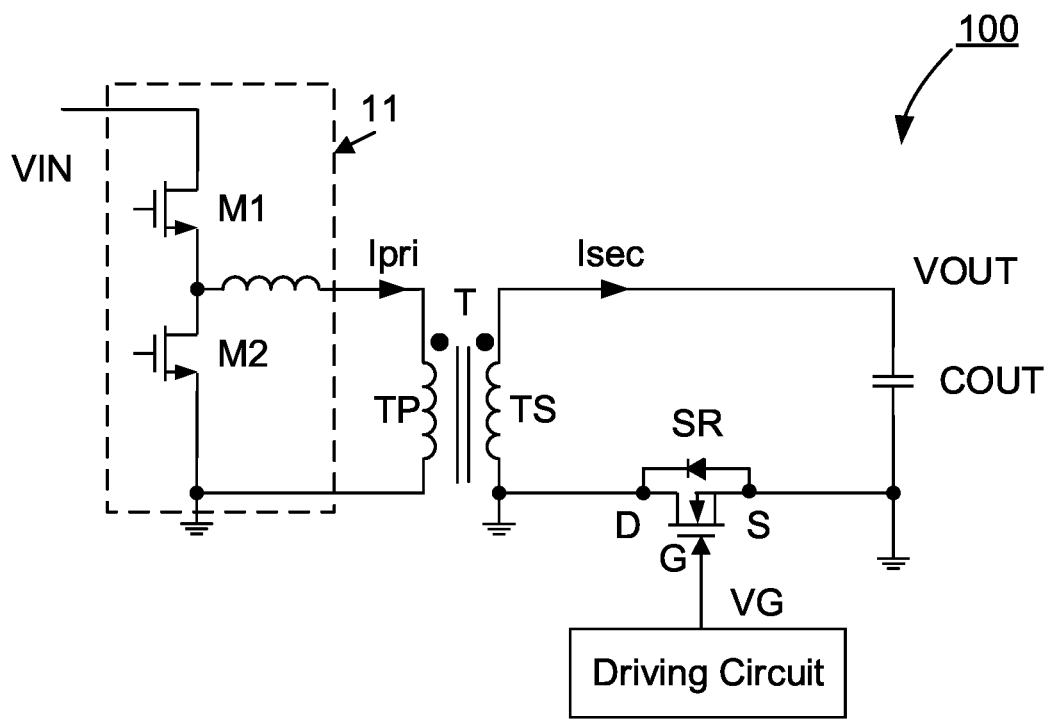
FIG. 1 is a schematic diagram of a synchronous rectifying circuit 100 according to an embodiment of the present invention.

FIG. 1 schematically illustrates a resonant converter 100 in accordance with an embodiment of the present invention. The resonant converter 100 may comprise a primary circuit 11, a transformer T, a synchronous rectifier SR and a driving circuit. The primary circuit 11 may be configured to receive an input signal VIN and convert the input signal VIN into an AC signal. The transformer T may comprise a primary winding TP and a secondary winding TS. The primary winging TP may be coupled to the primary circuit 11 to receive the AC signal. The synchronous rectifier SR may be coupled between the secondary winding TS and a load COUT. In the embodiment of FIG. 1, the synchronous rectifier SR may comprise a drain D, a source S and a gate G. The drain D may be coupled to a first terminal of the secondary winding TS. The source S may be coupled to a first terminal of the load COUT and a reference ground. It will be obvious to one of ordinary skill in the art that, in another embodiment, the source S of the synchronous rectifier SR may be coupled to the first terminal of the secondary winding TS, the drain D of the synchronous rectifier SR may be coupled to the first terminal of the load COUT, a second terminal of the secondary winding TS and a second terminal of the load COUT may be coupled to the reference ground.

The driving circuit may be coupled to the gate G of the synchronous rectifier SR to provide a driving signal VG (i.e., an output driving voltage of the driving circuit) configured to control the ON/OFF and/or an on-resistance of the synchronous rectifier SR. As shown in FIG. 1, the resonant converter 100 may have a secondary current Isec flowing through the synchronous rectifier SR which generates a drain-source voltage between the drain D and the source S of the synchronous rectifier SR. In one embodiment, the resonant converter 100 may be a LLC converter. In another embodiment, the synchronous rectifier SR may be an N type MOSFET. It will be understood that these embodiments not intended to limit the invention to these embodiments, any topology or device suitable for resonant converters are possible.

Figure 2:
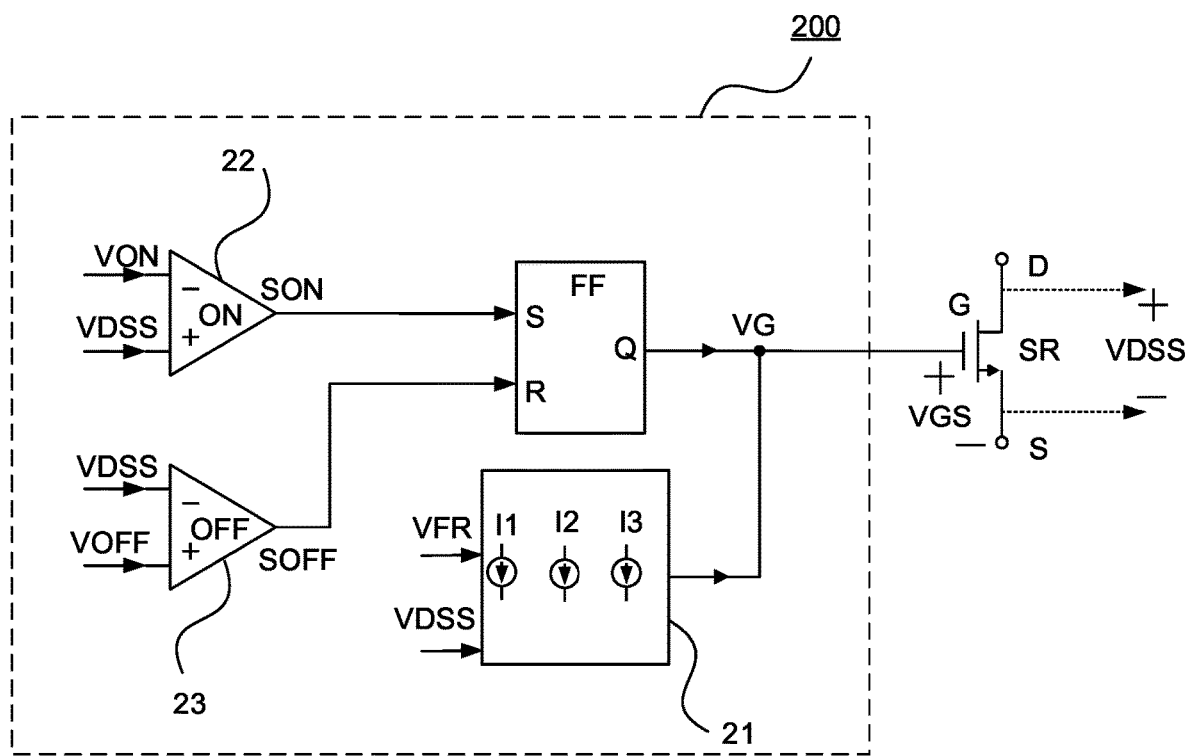
FIG. 2 is a schematic diagram of a driving circuit 200 for driving a synchronous rectifier device.

FIG. 2 schematically illustrates a driving circuit 200 for driving the synchronous rectifier SR. The synchronous rectifier SR may have a source S, a drain D and a gate G. The gate G may be configured to receive the driving signal VG (i.e., the output driving voltage of the driving circuit). In the exemplary embodiment illustrated in FIG. 2, a drain-source voltage of the synchronous rectifier SR (i.e., a voltage drop between the gate G and the source) may be continuously detected to provide a monitoring signal VDSS. The driving circuit 200 may comprise a regulation circuit 21, an on control circuit 22 and an off control circuit 23. The on control circuit 22 may comprise a first input terminal configured to receive the monitoring signal VDSS, a second input terminal configured to receive an on threshold voltage VON and an output terminal configured to provide a turning-on signal SON. The driving circuit 200 may be configured to drive the synchronous rectifier SR ON for instance in response to the turning-on signal SON when the monitoring signal VDSS falls below the on threshold voltage VON. The off control circuit 23 may comprise a first input terminal configured to receive the monitoring signal VDSS, a second terminal configured to receive an off threshold voltage VOFF and an output terminal configured to provide a turning-off signal SOFF. The driving circuit 200 may be configured to drive the synchronous rectifier SR OFF for instance in response to the turning-off signal SOFF when the monitoring signal VDSS rises above the off threshold voltage VOFF. The regulation circuit 21 may comprise a first terminal configured to receive the monitoring signal VDSS, a second terminal configured to receive a forward threshold voltage VFR and an output terminal coupled to the gate G of the synchronous rectifier SR to control a gate-source voltage VGS of the synchronous rectifier SR (i.e., a voltage drop between the gate G and the source S). When the monitoring signal VDSS reaches the forward threshold voltage VFR, the regulation circuit 21 may be configured to regulate the gate-source voltage VGS of the synchronous rectifier SR to decrease. In one embodiment of the present invention, the regulation circuit 21 is configured to regulate the driving signal VG (i.e., the output driving voltage of the driving circuit) to decreases in the form of a first plurality of linearly dropping ramp segments to a first voltage level within a first pull-down period. In one embodiment of the present invention, the regulation circuit 21 is configured to regulate the driving signal VG (i.e., the output driving voltage of the driving circuit) to further decreases in the form of a second plurality of linearly dropping ramp segments to a second voltage level within a second pull-down period. In one embodiment of the present invention, the regulation circuit 21 is configured to regulate the driving signal VG (i.e., the output driving voltage of the driving circuit) to further decreases in the form of a third plurality of linearly dropping ramp segments to a third voltage level within a third pull-down period.

Figure 3:
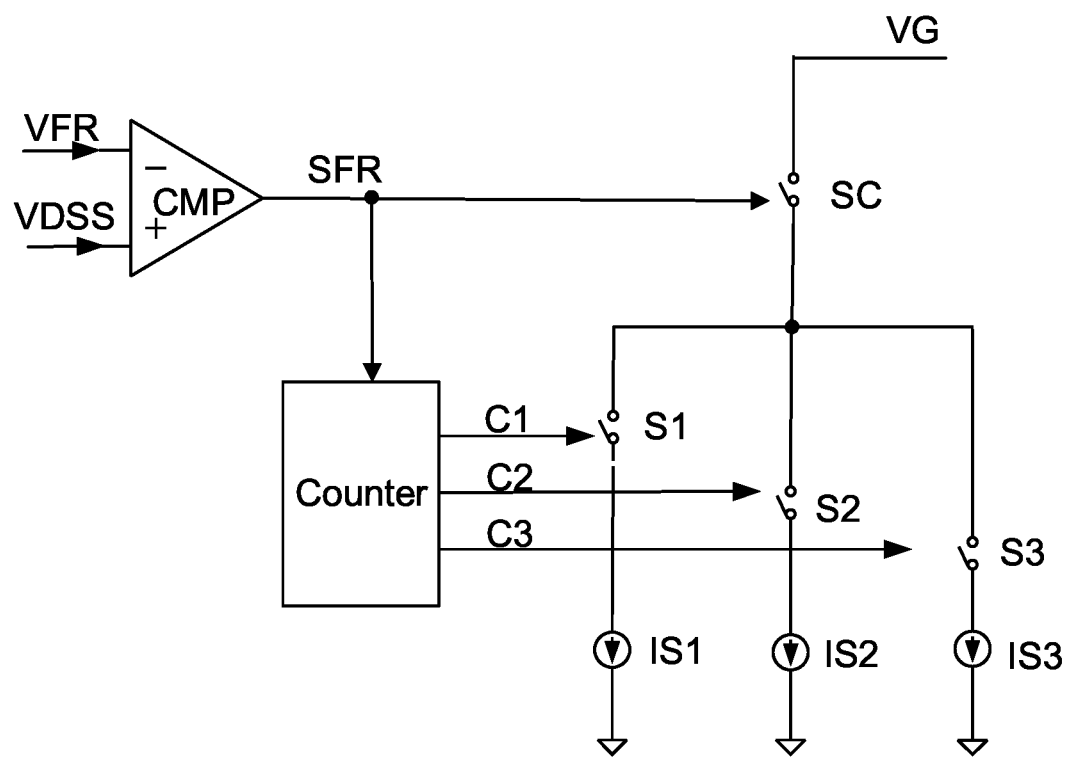
FIG. 3 is a schematic diagram of a regulation circuit in accordance with an embodiment of the present invention.

FIG. 3 schematically illustrates the regulation circuit 21 in accordance with an embodiment of the present invention. The regulation circuit 21 may comprise a pull-down switch SC, a comparator CMP, a first current source configured to provide a first switching current IS1, a second current source configured to provide a second switching current IS2 and a third current source configured to provide a third switching current IS3. In one embodiment, the first switching current IS1 may be larger than the second switching current IS2 and the second switching current IS2 may be larger than the third switching current IS3. In one embodiment, the first switching current IS1, the second switching current IS2 and the third switching current IS3 are positively related to the gate-source voltage VGS of the synchronous rectifier SR, that is, when the gate-source voltage VGS of the synchronous rectifier SR increases, the first switching current IS1, the second switching current IS2 and the third switching current IS3 increase. In one embodiment, the first switching current IS1, the second switching current IS2 and the third switching current IS3 may be proportional to the gate-source voltage VGS of the synchronous rectifier SR. The comparator CMP may comprise a first terminal configured to receive monitoring signal VDSS, a second terminal configured to receive the forward threshold voltage VFR and an output terminal configured to provide a pull-down signal SFR. When the monitoring signal VDSS arises above the forward threshold voltage VFR, the pull-down signal SFR toggles from a first state to a second state. The pull-down switch SC may comprise a first terminal and a second terminal. The first terminal may be coupled to gate G of the synchronous rectifier SR. The regulation circuit 21 may further comprise a first switch S1, a second switch S2, a third switch S3 and a counter. The counter may be configured to receive the pull-down signal SFR and generate a first control signal C1, a second control signal C2 and a third control signal C3 based on the received pull-down signal SFR to control the ON/OFF of the first switch S1, the second switch S2 and the third switch S3 respectively.

In the embodiment of FIG. 3, when the pull-down signal SFR toggles from the first state to the second state for the first time, the first switch S1, the second switch S2 and the third switch S3 are all turned ON, thereby pulling down the first current I1 from the gate G of the synchronous rectifier SR. The first current I1 is equal to the sum of the first switch current IS1, the second switch current IS2 and the third switch current IS3. When the pull-down signal SFR toggles from the first state to the second state for the second time, the first switch S1 is turned OFF while the second switch S2 and the third switch S3 are turned ON, further pulling down the second current I2 from the gate G of the synchronous rectifier SR. The second current I2 is equal to the sum of the second switch current IS2 and the third switch current IS3. When the pull-down signal SFR toggles from the first state to the second state for the third time, the first switch S1 and the second switch S2 are turned OFF while the third switch S3 is turned ON to pull down the first current I3 from the gate G of the synchronous rectifier SR. The third current I3 is equal to the third switch current IS3.

Figure 4:
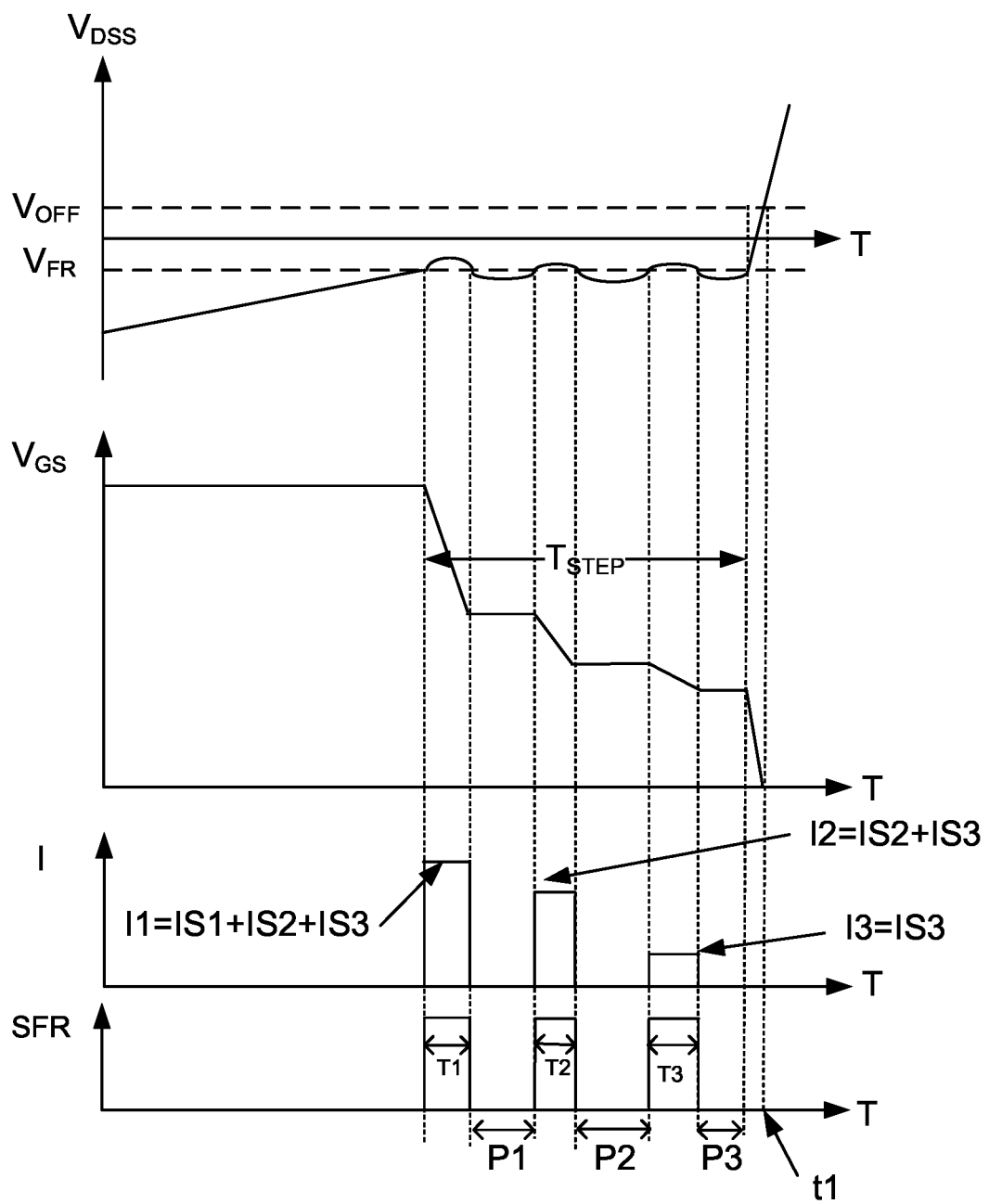
FIG. 4 is a waveform diagram showing waveforms of several signals in the regulation circuit according to the embodiment of FIG. 3.

FIG. 4 illustrates a waveform diagram showing waveforms of several signals in regulation circuit 21, in accordance with the embodiment of FIG. 3. As shown in FIG. 4, when the monitoring signal VDSS is below the forward threshold voltage VFR, the pull-down signal SFR stands the first state; when the monitoring signal VDSS goes high and reaches the forward threshold voltage VFR, the pull-down signal SFR toggles to the second state. As illustrated in FIG. 4, when monitoring signal VDSS reaches the forward threshold voltage VFR for the first time, the pull-down signal SFR toggles to the second state for the first time, activates the first switch S1, the second switch S2 and the third switch S3 to be all turned ON, thereby pulling down the first current I1 from the gate G of the synchronous rectifier SR. The first current I1 is equal to the sum of the first switch current IS1, the second switch current IS2 and the third switch current IS3. This action induces the gate-source voltage VGS of the synchronous rectifier SR to decreases linearly at a first rate during the first pull-down period T1. During a first waiting period P1, when the monitoring voltage VDSS goes low and falls below the forward threshold voltage VFR, the pull-down signal SFR toggles to the first state, thereby no current pulls down from the gate G of the synchronous rectifier SR. When the pull-down signal SFR toggles from the first state to the second state for the second time, activates the first switch S1 to be turned OFF while the second switch S2 and the third switch S3 to be turned ON, further pulling down the second current I2 from the gate G of the synchronous rectifier SR. The second current I2 is equal to the sum of the second switch current IS2 and the third switch current IS3. This action induces the gate-source voltage VGS of the synchronous rectifier SR to decreases linearly during the second pull-down period T2. Again, during a second waiting period P2, when the monitoring voltage VDSS goes low and falls below the forward threshold voltage VFR, the pull-down signal SFR jumps to the first state. Thus, no current pulls down from the gate G of the synchronous rectifier SR and the gate-source voltage VGS of the synchronous rectifier SR remains constant. When the pull-down signal SFR toggles from the first state to the second state for the third time, the first switch S1 and the second switch S2 are turned OFF while the third switch S3 is turned ON to pull down the first current I3 from the gate G of the synchronous rectifier SR. The third current I3 is equal to the third switch current IS3. This action induces the gate-source voltage VGS of the synchronous rectifier SR to decreases linearly during the third pull-down period T3. Likewise, when the monitoring voltage VDSS goes low and falls below the forward threshold voltage VFR, the pull-down signal SFR toggles to the first state. Thus, no current pulls down from the gate G of the synchronous rectifier SR and the gate-source voltage VGS of the synchronous rectifier SR remains constant during the third waiting period P3. As shown in FIG. 4, at a moment t1 for instance, the monitoring voltage VDSS of the synchronous rectifier SR reaches the turn-off threshold voltage VOFF, the gate-source voltage VGS of the synchronous rectifier SR rapidly decreases to zero and turns the synchronous rectifier SR OFF.

It will be understood that the circuit shown in FIG. 3 and the waveform shown in FIG. 4 are described here for provide an example. The waiting periods P1, P2, P3 are not necessary in some embodiments.

Figure 5:
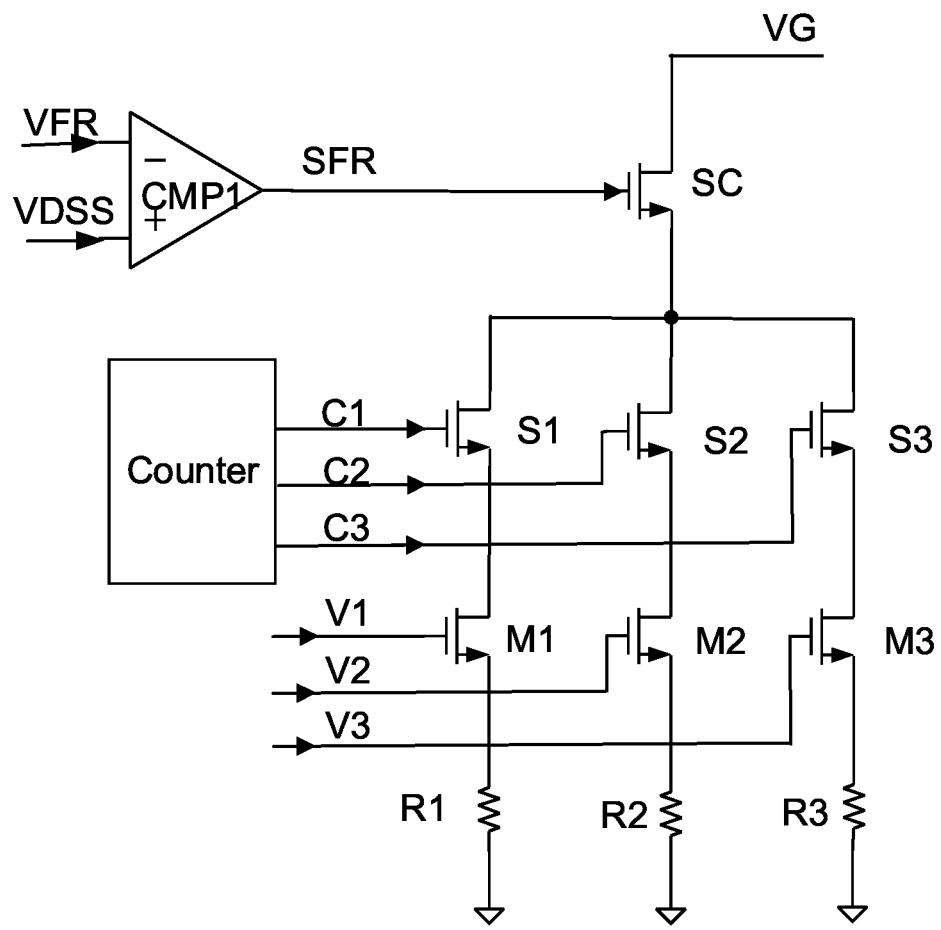
FIG. 5 is a schematic detailed diagram of the regulation circuit in accordance with the embodiment of FIG. 3.

FIG. 5 illustrates the regulation circuit 21 in accordance with the embodiment of FIG. 3. As shown in FIG. 5, the regulation circuit 21 may include a first current source, a second current source and a third current source. The first current source may comprise a first transistor M1 and a first resistor R1 coupled in series between the first switch S1 and the reference ground. The second current source may comprise a second transistor M2 and a second resistor R2 coupled in series between the second switch S2 and the reference ground. The third current source may comprise a third transistor M3 and a third resistor R3 coupled in series between the third switch S3 and the reference ground. In the embodiment of FIG. 5, the gate of the first transistor M1 may be configured to receive a first voltage V1, the gate of the second transistor M2 may be configured to receive a second voltage V2 and the gate of the third transistor M3 may be configured to receive a second voltage V3. In an embodiment, the first voltage V1 may be large than the second voltage V2 and the second voltage V2 may be large than the third voltage V3. In another embodiment, the first voltage V1, the second voltage V2 and the third voltage V3 are positively related to the gate-source voltage VGS of the synchronous rectifier SR, and the first resistor R1, the second resistor R2 and the third resistor R3 have equal resistance. In one embodiment, the first voltage V1, the second voltage V2, the third voltage V3 are all equal to the gate-source voltage VGS of the synchronous rectifier SR, i.e. V1=V2=V3=VGS, and the resistance of the first resistor R1 is less than the resistance of the second resistor, the resistance of the second resistor R2 is less than the resistance of the third resistor R3. In another embodiment, the first voltage V1, the second voltage V2, and the third voltage V3 are all equal and they are less than the gate-source voltage VGS of the synchronous rectifier SR, i.e., V1=V2=V3<VGS. It should be understood that the first current source, the second current source and the third current source may comprise any topology suitable to generate the first switching current IS1, the second switching current IS2 and the third switching current IS3.

Figure 6:
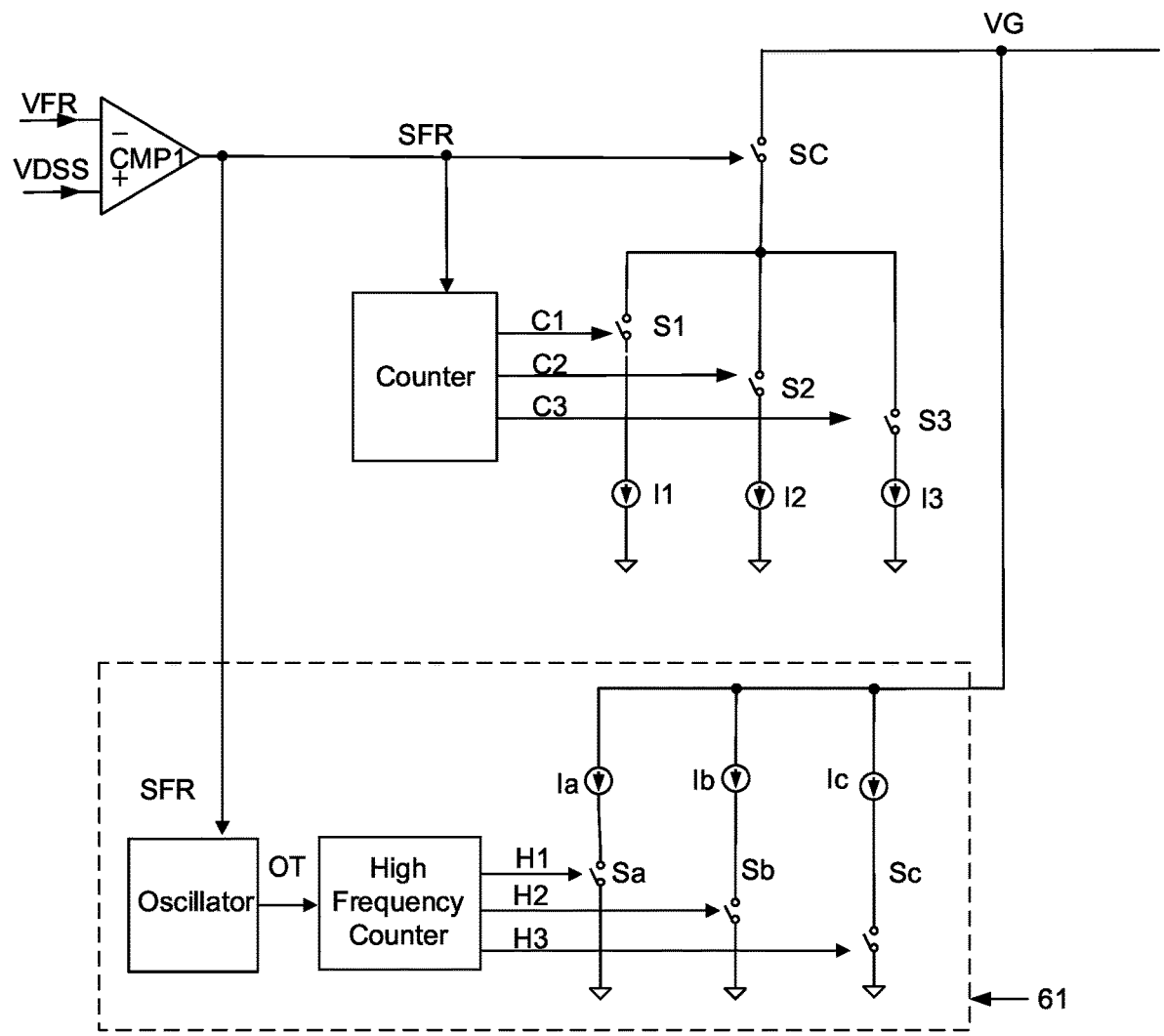
FIG. 6 is a schematic diagram of another regulation circuit in accordance with an embodiment of the present invention.

FIG. 6 schematically illustrates another regulation circuit 21 in accordance with an embodiment of the present invention. Compared with the regulation circuit shown in FIG. 3, the regulation circuit shown in FIG. 6 may further comprise a high frequency regulation circuit 61, wherein the high frequency regulation circuit 61 may comprise an oscillator used to provide a clock signal OT, a high frequency counter, a first high frequency switch Sa, a second high frequency switch Sb and a third high frequency switch Sc. The high frequency regulation circuit 61 may further comprise a first high-frequency current source, a second high-frequency current source, and a third high-frequency current source. The first high frequency switch Sa may have a first terminal and a second terminal, wherein the first terminal is coupled to a reference ground. The second high frequency switch Sb and the third high frequency switch Sc may have their first terminal and second terminal which are all configured in the same way as the first high frequency switch Sa. The first high-frequency current source may be coupled between the gate G of the synchronous rectifier SR and the first high-frequency switch Sa to provide a first high-frequency current Ia, the second high-frequency current source may be coupled between the gate G of the synchronous rectifier SR and the second high-frequency switch Sb to provide a second high-frequency current Ib, and the third high-frequency current source may be coupled between the gate G of the synchronous rectifier SR and the third high-frequency switch Sc to provide a third high-frequency current Ic. The high frequency counter may be configured to receive the clock signal OT and generate a first high frequency control signal H1, a second high frequency control signal H2 and a third high frequency control signal H3 based on the received clock signal OT to control the ON/OFF of the first high frequency switch Sa, the second high frequency switch Sb and the third high frequency switch Sc respectively.

In the embodiment of FIG. 6, when the first switch S1, the second switch S2 and the third switch S3 are all turned ON, i.e., during the first pull-down period T1, the high frequency counter may be activated to count the clock signal OT. In operation, when the first pulse of the clock signal OT comes, the first high frequency switch Sa may be turned ON while the second high frequency switch Sb and the third high frequency switch Sc may stand OFF; when the second pulse of the clock signal OT comes, the first high frequency switch Sa and the second high frequency switch Sb may be turned ON while and the third high frequency switch Sc may stand OFF; when the third pulse of the clock signal OT comes, the first high frequency switch Sa, the second high frequency switch Sb and the third high frequency switch Sc may be turned ON. Likewise, the high frequency counter may be activated to count the clock signal OT when the first switch S1 is OFF, the second switch S2 and the third switch S3 are turned ON, i.e., during the second pull-down period T2: when the first pulse of the clock signal OT comes, the first high frequency switch Sa may be turned ON while the second high frequency switch Sb and the third high frequency switch Sc may stand OFF; when the second pulse of the clock signal OT comes, the first high frequency switch Sa and the second high frequency switch Sb may be turned ON while and the third high frequency switch Sc may stand OFF; when the third pulse of the clock signal OT comes, the first high frequency switch Sa, the second high frequency switch Sb and the third high frequency switch Sc may be turned ON. Likewise, the high frequency counter may be activated to count the clock signal OT when the first switch S1 and the second switch S2 are OFF, and the third switch S3 are turned ON, i.e., during the second pull-down period T3: when the first pulse of the clock signal OT comes, the first high frequency switch Sa may be turned ON while the second high frequency switch Sb and the third high frequency switch Sc may stand OFF; when the second pulse of the clock signal OT comes, the first high frequency switch Sa and the second high frequency switch Sb may be turned ON while and the third high frequency switch Sc may stand OFF; when the third pulse of the clock signal OT comes, the first high frequency switch Sa, the second high frequency switch Sb and the third high frequency switch Sc may be turned ON. In one embodiment, the first high frequency current source, the second high frequency current source and the third high frequency current source are all equal. In one embodiment, the time period of the clock signal OT is less than the first pull-down time T1. In another embodiment, the time period of the clock signal OT is less than the first pull-down time T1, the second pull-down time T2 and the third pull-down time T3. In one embodiment, the time period of the clock signal OT is less than 40 ns.

Figure 7:
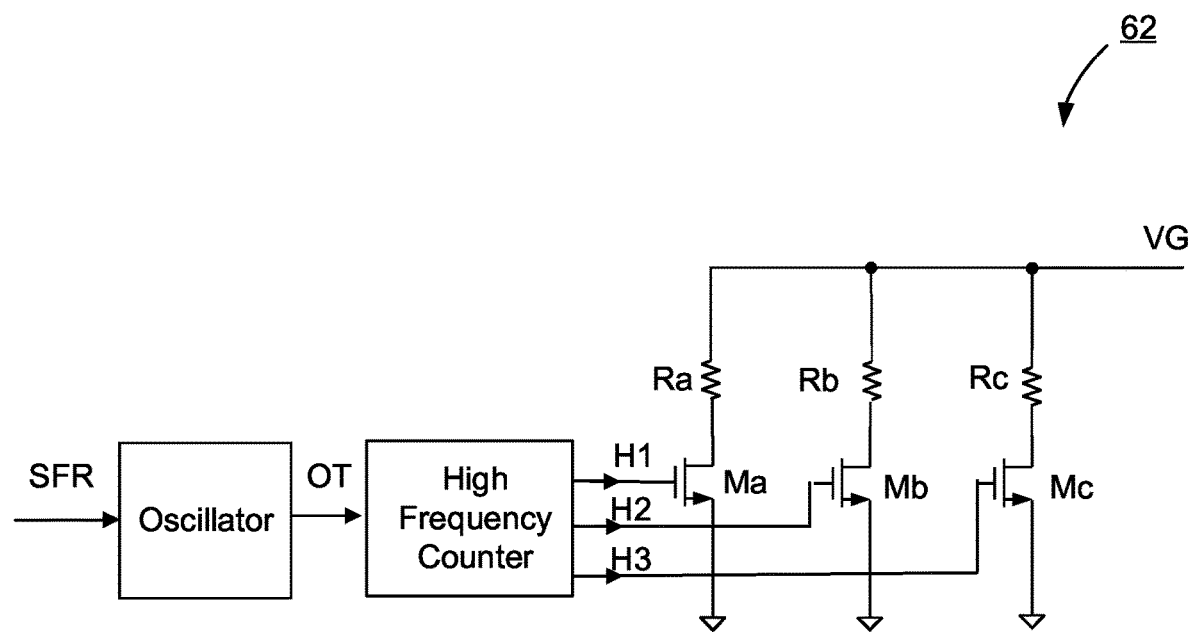
FIG. 7 is a schematic diagram of a high frequency regulation circuit in accordance with an embodiment of the present invention.
Figure 8:
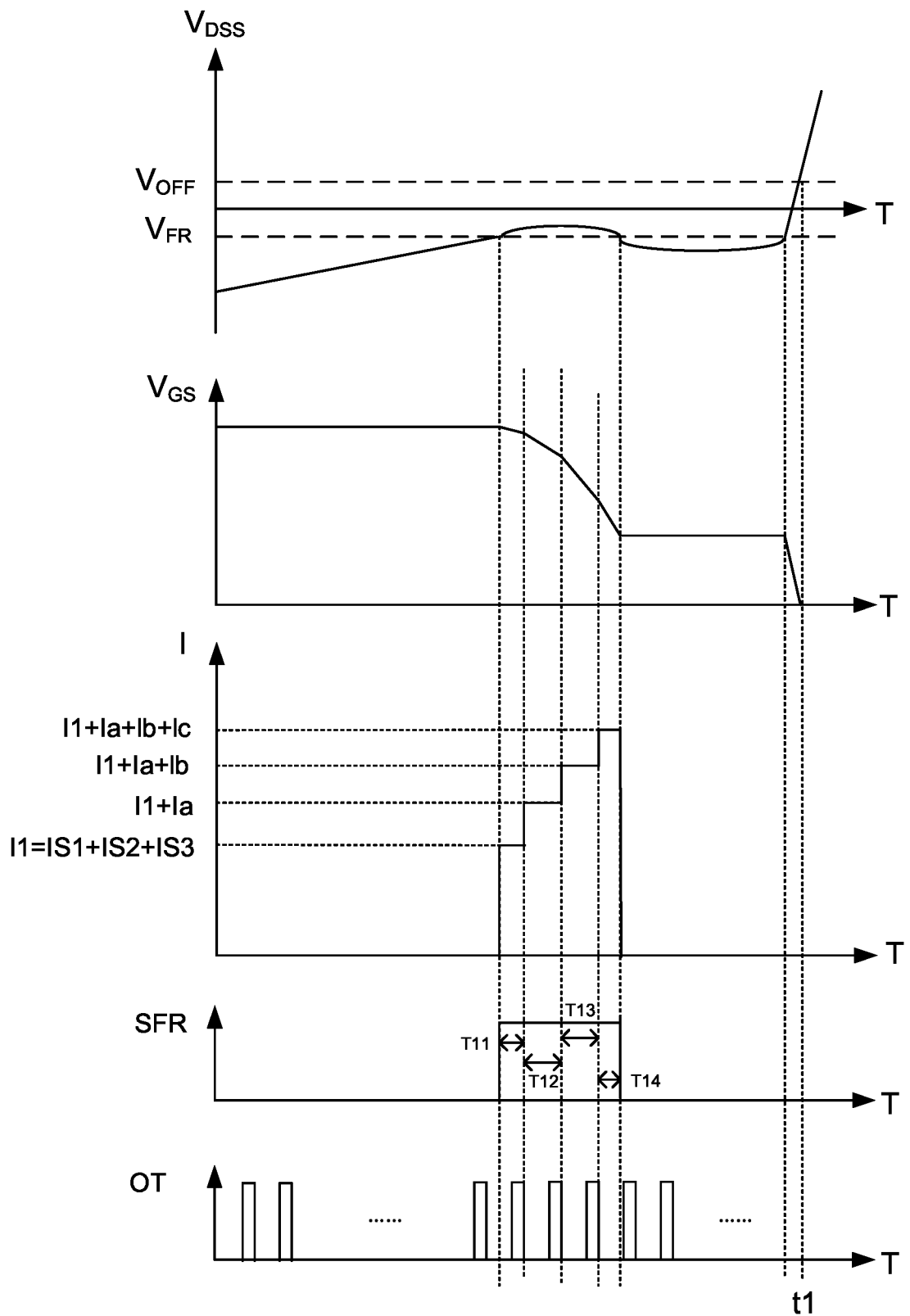
FIG. 8 is a waveform diagram showing waveforms of several signals in the regulation circuit according to the embodiment of FIG. 6.

FIG. 7 schematically illustrates another high frequency regulation circuit 62 in accordance with an embodiment of the present invention. In the embodiment of FIG. 7, the first high frequency switch of the high frequency regulation circuit 62 may comprise a first high frequency transistor Ma. The gate terminal of the first high frequency transistor Ma may be configured to receive a first high frequency control signal H1 and the source terminal of the first high frequency transistor Ma may be coupled to the reference ground. The first high-frequency current source of the high frequency regulation circuit 62 may comprise a first high-frequency resistor R1 coupled between the gate G of the synchronous rectifier SR and the drain of the first high frequency transistor Ma. The second high frequency switch of the high frequency regulation circuit 62 may comprise a second high frequency transistor Mb. The gate of the second high frequency transistor Mb may be configured to receive a second high frequency control signal H2 and the source of the second high frequency transistor Mb may be coupled to the reference ground. The second high-frequency current source of the high frequency regulation circuit 62 may comprise a second high-frequency resistor R2 coupled between the gate G of the synchronous rectifier SR and the drain of second high frequency transistor Mb. The third high frequency switch of the high frequency regulation circuit 62 may comprise a third high frequency transistor Mc. The gate of the third high frequency transistor Mc may be configured to receive a third high frequency control signal H3 and the source of the third high frequency transistor Mc may be coupled to the reference ground. The third high-frequency current source of the high frequency regulation circuit 62 may comprise a third high-frequency resistor R3 coupled between the gate G of the synchronous rectifier SR and the drain of the third high frequency transistor Mc. It should be understood that the implementation of the high-frequency regulation circuit is not limited to the one shown in FIG. 7, it may comprise any topology suitable to realize the function of the high-frequency regulation circuit covered by the present invention FIG. 8 illustrates a waveform diagram showing waveforms of several signals in regulation circuit 21, in accordance with the embodiment of FIG. 6. As illustrated in FIG. 8, when monitoring signal VDSS reaches the forward threshold voltage VFR for the first time, activates the first switch S1, the second switch S2 and the third switch S3 to be all turned ON, thereby pulling down the first current I1 from the gate G of the synchronous rectifier SR. The first current I1 is equal to the sum of the first switch current IS1, the second switch current IS2 and the third switch current IS3. This action induces the gate-source voltage VGS of the synchronous rectifier SR to decreases linearly at a first rate during a period T11. Then the high frequency counter may be activated to count the clock signal OT. When the first pulse of the clock signal OT comes, the first high frequency switch Sa may be turned ON while the second high frequency switch Sb and the third high frequency switch Sc may stand OFF, thereby further pulling down the first high-frequency current Ia from the gate G of the synchronous rectifier SR. This action induces the gate-source voltage VGS of the synchronous rectifier SR to decreases linearly at a second rate larger than the first rate during a period T12. When the second pulse of the clock signal OT comes, the first high frequency switch Sa and the second high frequency switch Sb may be turned ON while and the third high frequency switch Sc may stand OFF, thereby further pulling down the second high-frequency current Ib from the gate G of the synchronous rectifier SR. This action induces the gate-source voltage VGS of the synchronous rectifier SR to decreases linearly at a third rate larger than the second rate during a period T13. When the third pulse of the clock signal OT comes, the first high frequency switch Sa, the second high frequency switch Sb and the third high frequency switch may be turned ON, thereby further pulling down the third high-frequency current Ic from the gate G of the synchronous rectifier SR. This action induces the gate-source voltage VGS of the synchronous rectifier SR to decreases linearly at a fourth rate larger than the third rate during a period T14. In the embodiment of FIG. 8, when the monitoring signal VDSS reaches the forward threshold voltage VFR, the gate-source voltage VGS of the synchronous rectifier SR is regulated to decrease in the form of a first plurality of linearly dropping ramp segments to a first voltage level, wherein the first plurality of linearly dropping ramp segments have a successively increased dropping slope/rate. In another embodiment, when the monitoring signal VDSS reaches the forward threshold voltage VFR for the second time, the high frequency counter may be activated to count the clock signal OT and the gate-source voltage VGS of the synchronous rectifier SR is regulated to decrease in the form of a second plurality of linearly dropping ramp segments to a second voltage level lower than the first level, wherein the second plurality of linearly dropping ramp segments have a successively increased dropping slope/rate.

By using the driving circuit disclosed in the present invention, when the monitoring signal VDSS indicative of the drain-source voltage VDS of the synchronous rectifier SR arises above the forward threshold voltage VFR, the gate-source voltage VGS of the synchronous rectifier SR can decrease quickly without causing the violent jitter of the drain-source voltage VDS of the synchronous rectifier SR.

It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

The invention claimed is:

1. A driving circuit for driving a synchronous rectifier device, comprising:
a regulation circuit, configured to receive a first threshold voltage and a monitoring signal indicative of a drain-source voltage of the synchronous rectifier device, and further configured to regulate an output driving voltage of the driving circuit based on the first threshold voltage and the monitoring signal, wherein the output driving voltage is adapted to be configured to drive a gate terminal of the synchronous rectifier device, and wherein
when the monitoring signal reaches the first threshold voltage, the regulation circuit is further configured to regulate the output driving voltage to decrease in the form of a first plurality of linearly dropping ramp segments to a first voltage level within a first pull-down period.

2. The driving circuit of claim 1, wherein the first plurality of linearly dropping ramp segments have a successively increased dropping slope/rate.

3. The driving circuit of claim 1, wherein, after the first pull-down period, the regulation circuit is further configured to regulate the output driving voltage to further decrease in the form of a second plurality of linearly dropping ramp segments to a second voltage level lower than the first voltage level within a second pull-down period.

4. The driving circuit of claim 3, wherein the first plurality of linearly dropping ramp segments have a first uniform dropping slope/rate.

5. The driving circuit of claim 4, wherein the second plurality of linearly dropping ramp segments have a second uniform dropping slope/rate.

6. The driving circuit of claim 5, wherein the first uniform dropping slope/rate is larger than the second uniform dropping slope/rate.

7. The driving circuit of claim 3, wherein the second plurality of linearly dropping ramp segments have a successively increased dropping slope/rate.

8. The driving circuit of claim 3, wherein, after the second pull-down period, the regulation circuit is further configured to regulate the output driving voltage to further decrease in the form of a third plurality of linearly dropping ramp segments to a third voltage level lower than the second voltage level within a third pull-down period.

9. The driving circuit of claim 8, wherein the first plurality of linearly dropping ramp segments have a first uniform dropping slope/rate, the second plurality of linearly dropping ramp segments have a second uniform dropping slope/rate, the third plurality of linearly dropping ramp segments have a third uniform dropping slope/rate; and wherein the first uniform dropping slope/rate is larger than the second uniform dropping slope/rate, the second dropping slope/rate is larger than the third uniform dropping slope/rate.

10. The driving circuit of claim 8, wherein the regulation circuit is configured to, regulate the output driving voltage to decreases to the first voltage level, by pulling down a first current during the first pull-down period; regulate the output driving voltage to decreases to the second voltage level, by pulling down a second current during the second pull-down period; and to regulate the output driving voltage to decreases to the third voltage level, by pulling down a third current during the third pull-down period.

11. The driving circuit of claim 3, wherein the regulation circuit is configured to, regulate the output driving voltage to decreases to the first voltage level during the first pull-down period, by pulling down a first current during the first pull-down period; and to regulate the output driving voltage to decreases to the second voltage level during the second pull-down period, by pulling down a second current during the second pull-down period.

12. The driving circuit of claim 1, wherein the regulation circuit is configured to, regulate the output driving voltage to decreases to the first voltage level during the first pull-down period, by pulling down a first current during the first pull-down period.

13. The driving circuit of claim 1, wherein the regulation circuit further comprises:
a pull-down switch, comprising a first terminal and a second terminal, wherein the first terminal is coupled to the gate terminal of the synchronous rectifier device;
a comparator, comprising a first terminal configured to receive the monitoring signal, a second terminal configured to receive the first threshold voltage and an output terminal configured to generate a pull-down signal to turn the pull-down switch on when the monitoring signal reaches the first threshold voltage;

a first group of current sources;

a first group of switches, wherein each switch of the first group of switches is coupled between the second terminal of the pull-down switch and one current source of the first group of current sources; and a counter, configured to receive the pull-down signal and control the ON/OFF of the group of switches based on the received pull-down signal.

14. The driving circuit of claim 13, wherein the first group of current sources comprises: a first current source, configured to provide a first switching current; a second current source, configured to provide a second switching current; and a third current source, configured to provide a third switching current.

15. The driving circuit of claim 14, wherein the first group of switches comprise: a first switch, coupled between the second terminal of the pull-down switch and the first current source; a second switch, coupled between the second terminal of the pull-down switch and the second current source; and a third switch, coupled between the second terminal of the pull-down switch and the third current source.

16. The driving circuit of claim 14, wherein the first switching current, the second switching current and the third switching current changes in a same direction as the output driving voltage.

17. The driving circuit of claim 14, wherein the first switching current is larger than the second switching current and the second switching current is larger than the third switching current.

18. The driving circuit of claim 13, further comprises a high-frequency regulation circuit, wherein the high-frequency regulation circuit comprises:

an oscillator, used to provide a clock signal;

a second group of current sources;

a second group of switches, wherein each switch of the second group of switches is coupled between one current source of the second group of current sources and the reference ground; and a high frequency counter, configured to receive the clock signal and control the ON/OFF of the second group of switches based on the received clock signal.

19. The driving circuit of claim 18, wherein the second group of switches comprises:

a first high frequency switch, comprising a first terminal and a second terminal, wherein the first terminal of the first high frequency switch is coupled to the reference ground;

a second high frequency switch, comprising a first terminal and a second terminal, wherein the first terminal of the second high frequency switch is coupled to the reference ground;

a third high frequency switch, comprising a first terminal and a second terminal, wherein the first terminal of the third high frequency switch is coupled to the reference ground; and wherein the second group of current sources comprises:

a first high-frequency current source, coupled between the gate terminal of the synchronous rectifier device and the first high-frequency switch to provide a first high-frequency current;

a second high-frequency current source; coupled between the gate terminal of the synchronous rectifier device and the second high-frequency switch to provide a second high-frequency current;

a third high-frequency current source; coupled between the gate terminal of the synchronous rectifier device and the third high-frequency switch to provide a third high-frequency current.

* * * * *